United States Patent Office 3,525,221
Patented Aug. 25, 1970

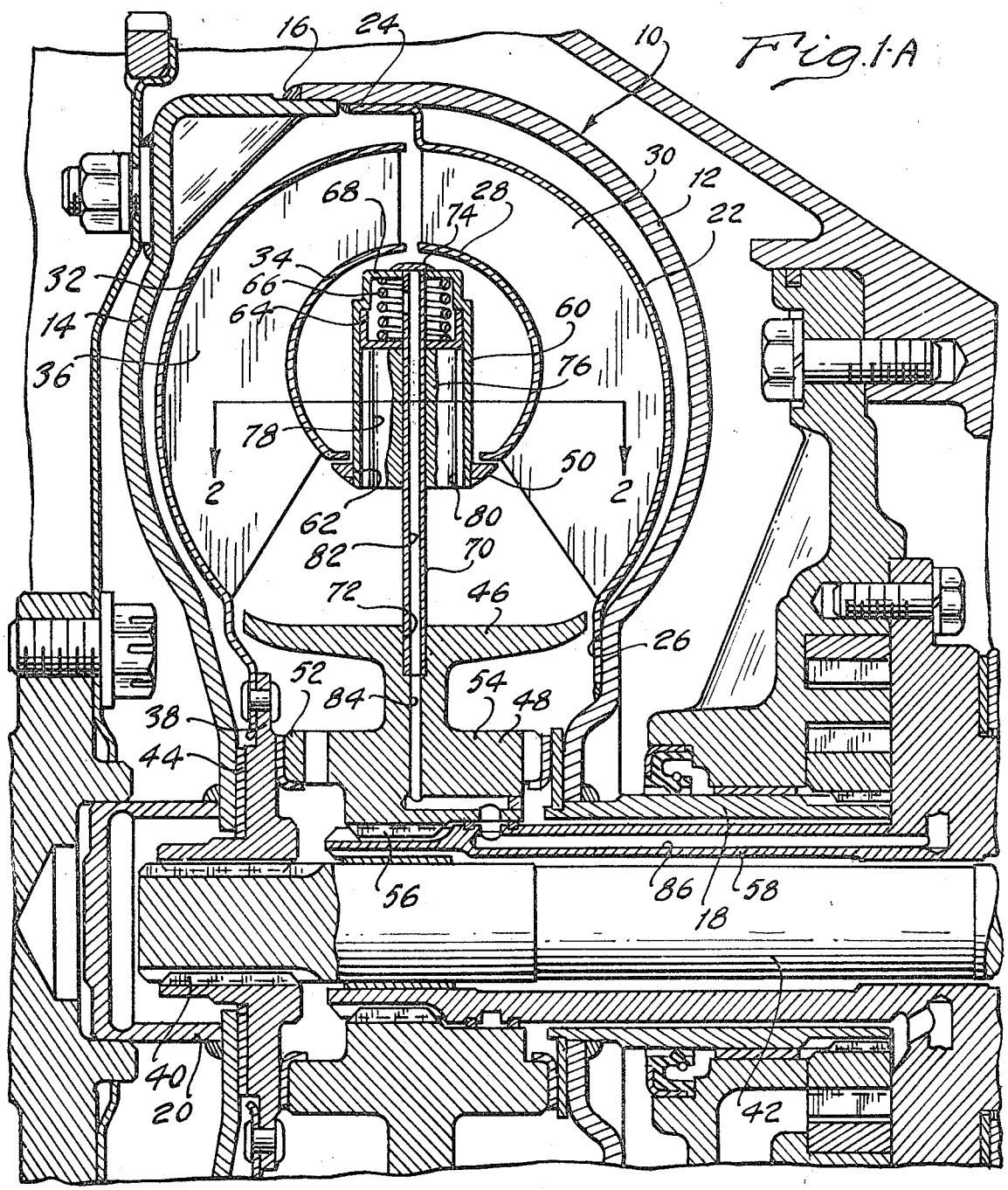
Fig. 1-A
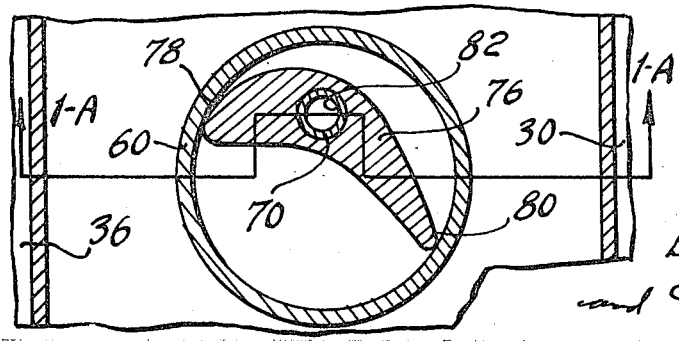
Fig. 2
INVENTORS:
STEWART P. MAXWELL
HERBERT C. LAZARUS
BY
ATTORNEYS.

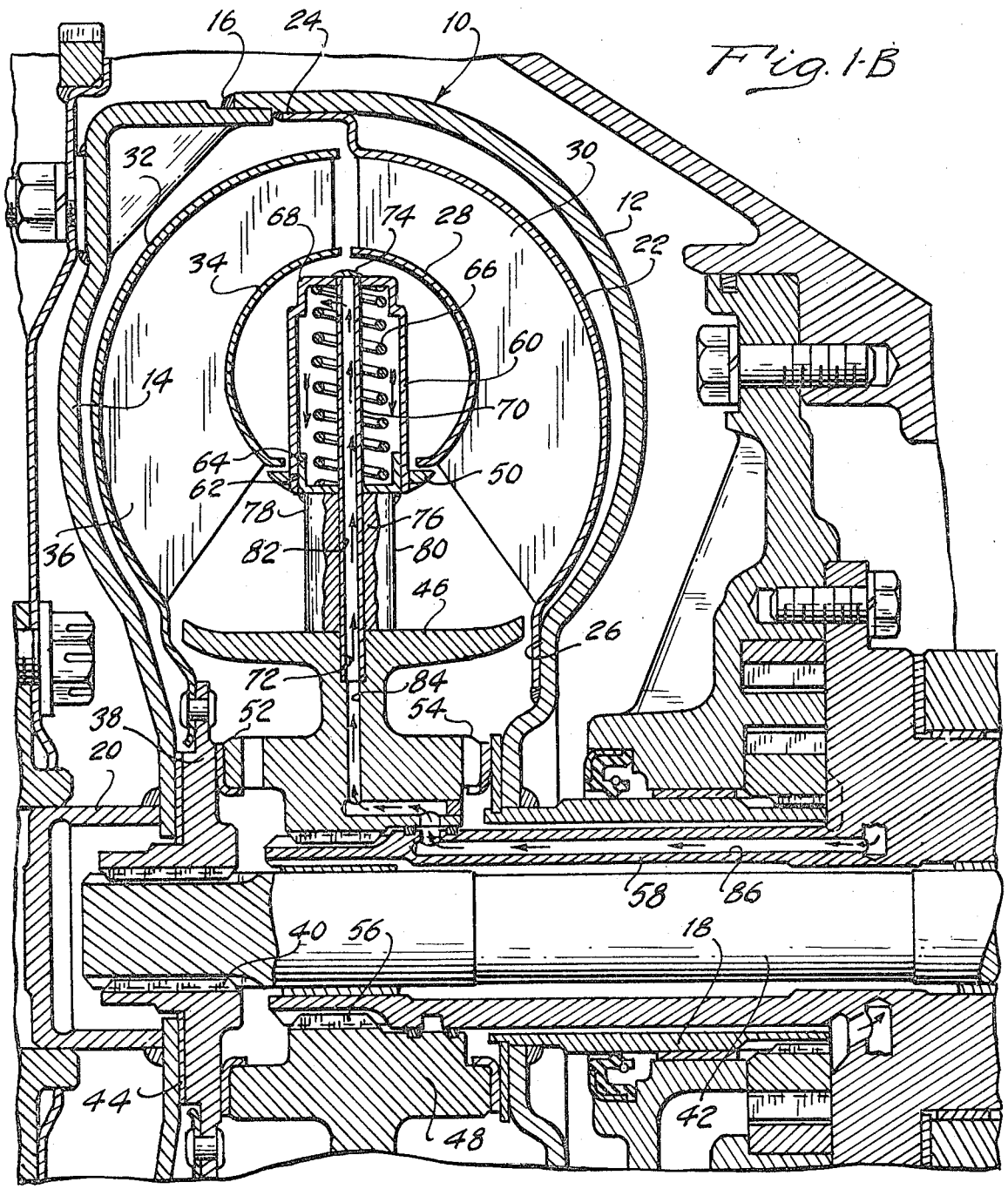

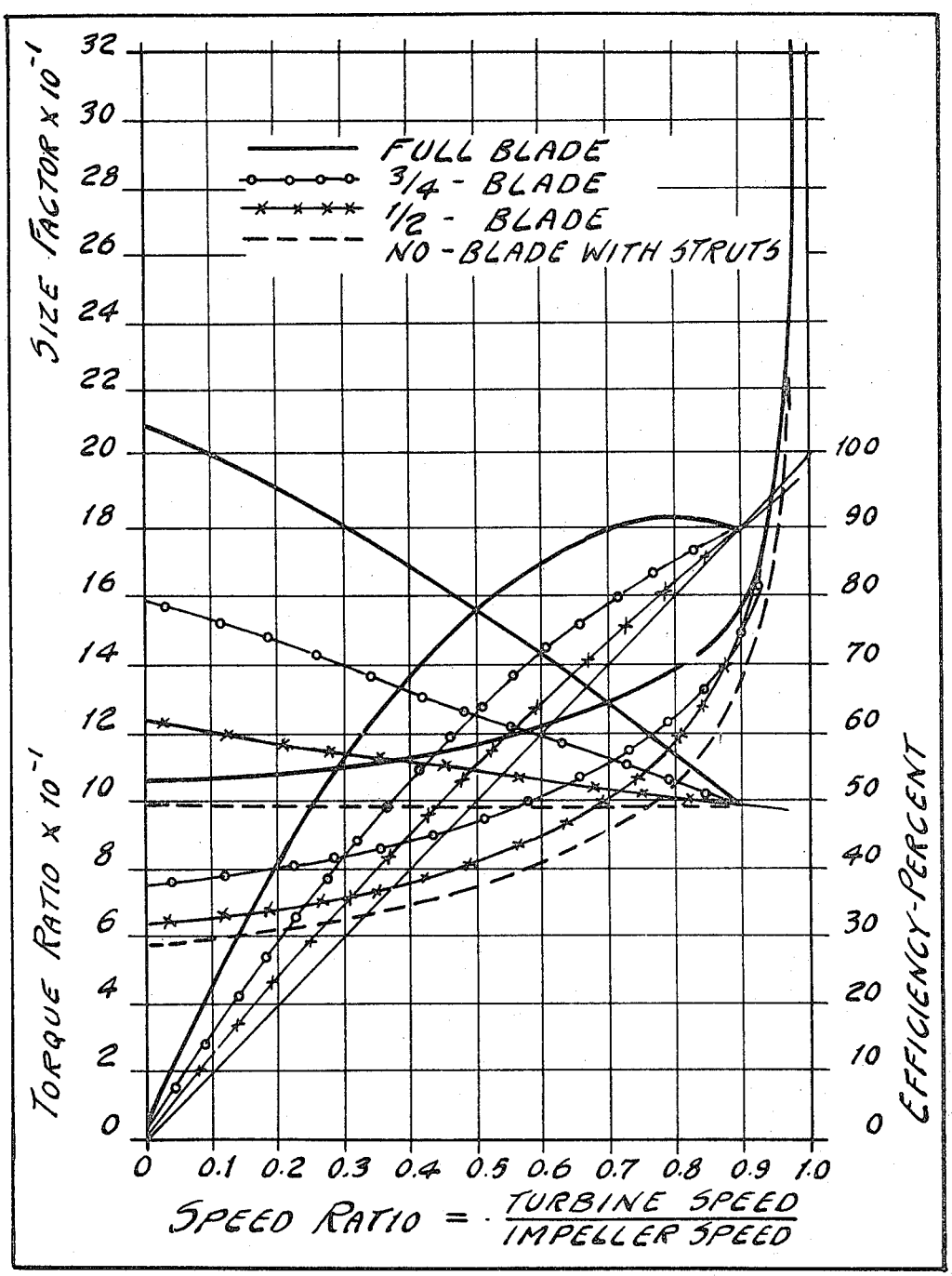

3,525,221
HYDROKINETIC TORQUE CONVERTER WITH
VARIABLE CAPACITY STATOR
Stewart P. Maxwell, Ann Arbor, and Herbert C. Lazarus,
Plymouth, Mich., assignors to Ford Motor Company,
Dearborn, Mich., a corporation of Delaware
Filed Nov. 19, 1968, Ser. No. 777,049
Int. Cl. F16d 33/04
U.S. Cl. 60—54
3 Claims

ABSTRACT OF THE DISCLOSURE

A hydrokinetic torque converter having a bladed impeller, a bladed turbine and a bladed stator situated in toroidal fluid flow relationship, the flow passages being defined in part by toroidal inner shrouds to which the inner margins of the blade elements are secured, and a stator blade retraction mechanism situated within the inner shroud structure for withdrawing radially the stator blades from the fluid flow circuit to an inactive position within the eye of the torus, whereby the hydrokinetic characteristics of the unit can be varied.

GENERAL DESCRIPTION OF THE INVENTION

Our invention relates generally to automotive vehicle drivelines. It includes a bladed hydrokinetic torque converter that forms a hydrokinetic driving connection between the crankshaft of the internal combustion engine and multiple ratio gearing.

It is usual practice in such hydrokinetic drivelines to provide a hydrokinetic torque converter with a bladed impeller and a bladed turbine situated in juxtaposed, fluid-flow relationship, the flow inlet section of the impeller and the flow exit of the turbine being located at a radially inward region. A bladed stator is mounted in the radially inward region for altering the direction of the tangential fluid flow velocity vectors as the fluid passes from the turbine exit section to the impeller entrance section.

In redirecting the toroidal fluid flow, the stator is subjected to a torque reaction. This torque reaction usually is distributed to a stationary portion of the mechanism through an overrunning coupling during operation of the hydrokinetic unit in the torque conversion range.

When the speed ratio of the hydrokinetic unit increases, approaching a one-to-one coupling condition, the torque reaction on the stator becomes zero. As the coupling condition is achieved, the stator freewheels and exerts no direct influence on the fluid flow velocity vectors.

In our improved construction we have provided a stator that does not require the presence of an overrunning coupling and whose hydrokinetic characteristics throughout the torque conversion range are variable rather than fixed. The stator comprises a fixed hub which defines one of the fluid flow shrouds for the torus circuit. An outer shroud for the stator assembly cooperates with the corresponding impeller and turbine shrouds to define the inner bounds of the circuit. The stator blades are disposed between the two stator shrouds.

Each blade of our improved construction is adapted to be moved in a radial direction with respect to the axis of rotatation of the bladed members. Radial adjustment of the individual stator blades is accomplished by a radially movable piston and cylinder mechanism situated within the eye of the toroidal fluid flow path.

When the stator blades are withdrawn completely from the torus circuit, the hydrokinetic unit acts as a coupling rather than as a converter. No torque reaction is developed on the stator. If the stator blades are partially withdrawn, only a partial hydrokinetic torque multiplication is achieved. If the inner blades are completely disposed within the torus flow path, a maximum torque multiplication at any given speed ratio is achieved.

Provision is made for adjusting the radial position of the stator blades in response to changes in the fluid pressure signal as it is distributed to the pistons for the blades.

BRIEF DESCRIPTION OF THE FIGURES OF THE DRAWINGS

FIG. 1A shows in longitudinal cross-section form a hydrokinetic unit employing the improved stator mechanism of our invention. It is taken along section line 1A—1A of FIG. 2.

FIG. 1B is a view similar to FIG. 1A with the stator blades in a full torque multiplication position.

FIG. 2 is a cross-section view taken along the plane of section line 2—2 of FIG. 1A.

FIG. 3 is a performance chart for the hydrokinetic unit of FIGS. 1A and 1B.

PARTICULAR DESCRIPTION OF THE INVENTION

Our hydrokinetic unit comprises an impeller shell 10 having a first shell part 12 and second shell part 14. The shell parts are joined by means of an overlapping welded seam as shown at 16. The hub of shell part 12 is secured to an impeller support sleeve shaft 18, which is journalled by means of a bushing within a bearing opening formed within the stationary wall of the transmission housing.

The hub of shell part 14 is joined to a pilot member 20 which is received within an opening in a crankshaft for an internal combustion engine, not shown. The crankshaft is joined by means of a yieldable drive plate to the outer portions of the shell part 14.

An outer impeller shroud 22, which generally conforms to the semi-toroidal shape of the shell part 12, is secured to the inner surface of the shell part 12 at its outer periphery as shown at 24. The hub of the shroud 22 is secured at 26 to the radially inward part of the shell part 12. The impeller includes also an inner shroud 28. Impeller blades 30 are situated between the shrouds 22 and 28 and define therewith radial outflow passages.

The turbine is disposed entirely within the shell 10. It includes an outer turbine shroud 32 having a shape that generally conforms to the shape of the shroud 22. The turbine includes also an inner shroud 34. Turbine blades 36 are situated between the shrouds 32 and 34 and define therewith radial inflow passages.

The radially inward margin of the shroud 32 is joined preferably by rivets to hub 38 which is splined at 40 to turbine shaft 42. The radially inward portion of the shell part 14 is separated from the hub 38 by a thrust washer 44.

Stator shroud 46 is joined directly to hub 48. A second stator shroud 50 encircles the shroud 46. Hub 48 includes bearing parts 52 and 54 which are separated from the inner portion of wheel part 12 and the hub 38 by thrust washers. Hub 48 is splined at 56 to a stationary stator sleeve shaft 58 which is connected in turn to the stationary transmission housing. Turbine shaft 42 is journalled rotatably within the sleeve shaft 58.

A cylinder 60 is secured within an opening 62 formed in the shroud 50. Several such cylinders 60 are provided at angularly spaced locations, each cylinder being received within an opening corresponding to the opening 62. Each cylinder 60 is located in the region between the shrouds 28 and 34.

Each cylinder 60 receives a radially movable piston 64. A compression spring 66 is situated between the end of the cylinder 60 and the piston 64, the end being shown at 68.

A stem or strut 70 extends radially outwardly from the hub 48. It is received within an opening 72 in shroud 46. Several such stems 70 are provided, one being associated with each cylinder 60. The radially outward ends of the stem 70 are secured as shown at 74 to the end 68 of the cylinder 60.

A stator blade 76 is carried by the piston 64. One stem 70 extends through each blade 76. The blades 76 are provided with a relatively blunt nose 78 located at the leading edge. A leading edge 80 of the blade 76 is formed with a relatively sharp angle which redirects the toroidal fluid flow so that it is provided with a tangential velocity vector component that extends in the same direction as the direction of the tangential fluid flow velocity vector located at a point on the entrance section of the impeller blades 30.

The stems 70 are provided with a central passage 82 through which fluid is distributed to the upper end of the piston 64 in the region of the spring 66. The radially inward ends of the stem 70 communicate with the passage 84 which in turn communicates with passage 86 formed in the stator sleeve shaft 58.

Passage 86 is pressurized with a pressure signal, piston 64 is moved downwardly thereby moving the stator blade into the path of flow of the particles of fluid as they traverse the torus circuit.

When the piston 64 assumes the position shown in FIG. 1, the blade 76 withdraws. Thus the hydrokinetic unit acts as a fluid coupling rather than as a converter.

The pressure of the fluid within the torus circuit tends normally to urge the pistons 64 radially outwardly. This pressure signal is overcome, however, by the spring force and the pressure signal in passage 86. By varying the magnitude of the pressure in passage 86, the radial position of the blades can be controlled.

If the blades are partially withdrawn, the effective blade angle can be controlled. The maximum torque multiplication at a speed ratio of stall would occur when the blades are wholly within the torus circuit. The influence of the stator blades on the direction of the toroidal fluid flow would be increased, and the torque ratio would be decreased at any given speed ratio as the blades are withdrawn. In this way a high degree of control over the operating characteristics of the unit can be achieved.

The pressure of the fluid in the torus circuit acts upon the pistons 64 to urge them radially outwardly against the force of the spring 66. The magnitude of the pressure acting on the radially outward side of the piston 64 is of a lesser magnitude than the circuit pressure. The force produced by that regulated pressure complements the force of the spring 66. Thus as the regulated pressure is varied, the position of the blades will change. The torque multiplying characteristics of the converter, therefore, can be varied as desired. It is possible, for example, to provide a tractive effort that is close to but slightly less than the traction force of the traction wheels throughout the period of acceleration of the vehicle. It is possible also to calibrate the movement of the blades so that maximum efficiency for any given speed ratio is achieved without sacrificing tractive effort.

FIG. 3 shows a performance chart for the hydrokinetic unit of FIG. 1. It shows the torque multiplication characteristics and the efficiency as well as the so-called "size factor" for the unit of FIG. 1 when the stator blades are fully active, when they are one-quarter withdrawn, when they are one-half withdrawn and when they are fully withdrawn. The appropriate legends are indicated on FIG. 3.

As can be seen, the maximum torque ratio at stall is achieved with a full blade. The greatest influence on torque ratio and size factor for any given change in the position of the stator blades is a maximum during the initial increment of withdrawal of the blade.

The size factor, as shown in FIG. 3, is defined as the impeller speed divided by the square root of the impeller torque at any given speed ratio. Speed ratio, of course, is defined as the turbine speed divided by the impeller speed. Torque ratio is defined as the turbine torque divided by the impeller torque for any given speed ratio.

Having thus described a preferred embodiment of our invention. What we claim and desire to secure by United States Letters Patent is:

1. A hydrokinetic torque converter mechanism comprising a bladed impeller, a bladed turbine and a bladed stator disposed in fluid flow relationship, said stator being situated between the flow exit portion of said turbine and the flow entrance section of said impeller, said turbine and said impeller having inner and outer shrouds which define in part, respectively, radial inflow and radial outflow passages of a torus circuit, the inner shrouds of said turbine and impeller define the innermost bounds of the torus circuit, said stator having a hub and a shroud ring encircling said hub, means for securing said hub to a stationary part of said mechanism to prevent rotation thereof in either direction, a plurality of cylinders in said shroud ring extending in a generally radial direction, a plurality of stator blades situated between said hub and said shroud ring, and a piston located in each cylinder, a separate one of said blades being connected to each of said pistons, said cylinders being disposed between the inner turbine shroud and the inner impeller shroud at the eye of the torus circuit.

2. A hydrokinetic torque converter mechanism comprising a bladed impeller, a bladed turbine and a bladed stator disposed in fluid flow relationship, said stator being situated between the flow exit portion of said turbine and the flow entrance section of said impeller, said turbine and said impeller having inner and outer shrouds which define in part, respectively, radial inflow and radial outflow passages of a torus circuit, the inner shrouds of said turbine and impeller define the innermost bounds of the torus circuit, said stator having a hub and a shroud ring encircling said hub, means for securing said hub to a stationary part of said mechanism to prevent rotation thereof in either direction, a plurality of cylinders in said shroud ring extending in a generally radial direction, a plurality of stator blades situated between said hub and said shroud ring, a piston located in each cylinder, a separate one of said blades being connected to each of said pistons, said cylinders being disposed between the inner turbine shroud and the inner impeller shroud at the eye of the torus circuit, a spring disposed between one end of said cylinder and said piston for urging said pistons radially inwardly, and fluid flow passage means extending through said hub to said cylinder for distributing fluid pressure to the radially outward sides of said pistons.

3. The combination as set forth in claim 2 wherein said passage means is defined in part by a radially disposed strut secured to said hub and extending through the torus circuit into the region of the eye of the torus circuit occupied by said cylinders, a separate one of said stator blades being supported by each stem whereby said stator blades move radially outwardly and radially inwardly as said pistons are adjusted, thereby providing variable hydrokinetic characteristics.

References Cited

UNITED STATES PATENTS 3,079,756  3/1963  Farrell _____ 60—54
3,263,525  8/1966  Jandasek _____ 60—54 XR EDGAR W. GEOGHEGAN, Primary Examiner